June 12, 1923.
R. W. SMITH
1,458,909
SADDLE OR SEAT OF MOTOR CYCLES, CYCLES, AND THE LIKE
Filed June 30, 1920
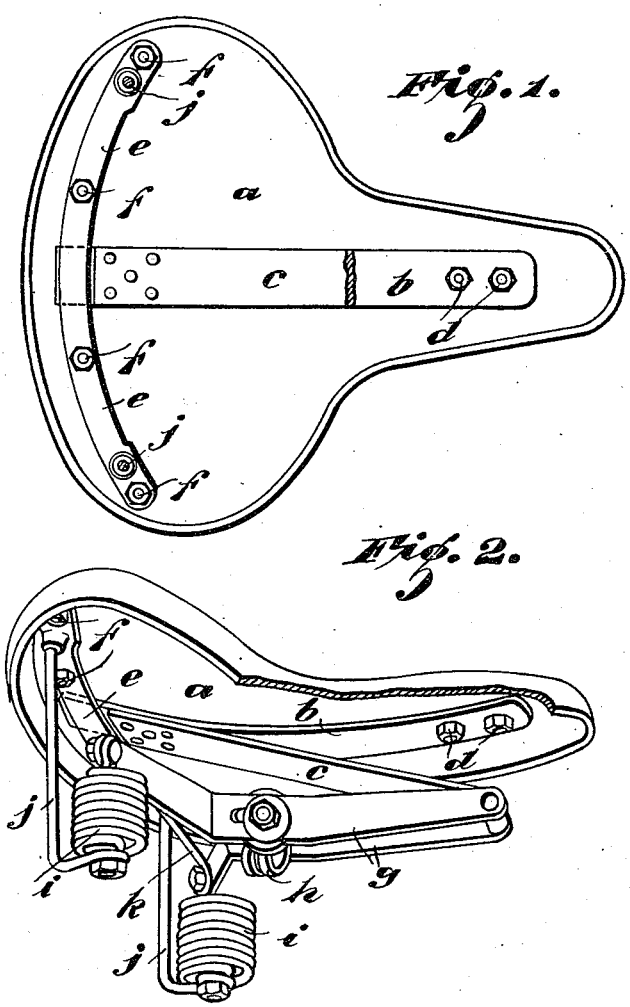

Patented June 12, 1923.

1,458,909

UNITED STATES PATENT OFFICE.

ROBERT WALKER SMITH, OF REDDITCH, ENGLAND.

SADDLE OR SEAT OF MOTOR CYCLES, CYCLES, AND THE LIKE.

Application filed June 30, 1920. Serial No. 393,159.

(GRANTED UNDER THE PROVISIONS OF THE ACT OF MARCH 3, 1921, 41 STAT. L., 1313.)

*To all whom it may concern:*

Be it known that I, ROBERT WALKER SMITH, a subject of the King of Great Britain, residing at Stoneleigh, Redditch, in the county of Worcester, England, have invented certain new and useful Improvements in or Relating to the Saddles or Seats of Motor Cycles, Cycles, and the like (for which I have filed application for patent in Great Britain, August 18, 1916, No. 108,053), of which the following is a specification.

This invention relates to saddles or seats of motor cycles, cycles, or the like, in which the supporting or maintenance in its appropriate position of the fore part of the seat or saddle is effected by virtue of a leaf spring incorporated so as to be self-contained with the seat or saddle. Such a leaf spring has previously been secured at its rear part to a reinforcing member secured to the under side of the saddle top plate. According to the present invention, in order to provide for the effective connection and combination of a leaf spring to and with the saddle top the rear extremity of the spring is secured to a transverse reinforcing strip secured under the rear portion of the saddle.

In order that this invention may be clearly understood and readily carried into practice, reference may be had to the appended explanatory sheet of drawings, upon which;—

Figure 1 is an inverted plan of a saddle having a spring combined therewith according to the present invention.

Figure 2 is a perspective view of the saddle shown in Figure 1.

In the drawings, $a$ represents the sheet metal saddle top which may if desired be suitably covered, $b$ is a longitudinal reinforcing strip or member secured thereto, and $c$ is a leaf spring riveted or otherwise secured at its rear extremity to the strip or member $b$. The member $b$ is secured at its front extremity to the saddle top $a$, as for instance by bolts $d$. The rear extremity of the longitudinal reinforcing member $b$ is clamped between the saddle top and a transverse reinforcing member $e$.

The under-frame $g$ is furnished with a clip $h$ adapted to provide for the coupling of such under-frame to the saddle pin or other member upon which the seat or saddle is mounted. Such under-frame may be essentially of T shape having its part of major width at the rear, and the lateral extremities of such part of major width may be coupled to the saddle or seat proper with intermediate springs. In the drawings, coiled tension springs $i$ are incorporated and coupled at their upper extremities to the under-frame $g$, and at their lower extremities to strut members $j$ which are secured at their upper extremities to the transverse reinforcing member $e$.

The leaf spring $c$ extends forwardly and downwardly diverging from the under surface of the seat or saddle, and is at its front extremity coupled to the fore extremity of the under-frame $g$. Thus the fore part of the saddle is enabled to fall and rise in relation to the under-frame by flexing the longitudinally disposed leaf spring, provision being advantageously incorporated to provide for a slight longitudinal movement of the fore part of the leaf spring in relation to the fort part of the under-frame. For this purpose the fore extremity of the spring $c$ may be bent to a hook form, the part of hook formation being adapted to embrace a transverse pivot or member forming part of the under-frame $g$. The under-frame is here shown as comprising two limbs which extend substantially parallel or converge slightly towards each other forwardly throughout the fore part or half of the seat or saddle, said limbs being bent outwardly at their rear extremities and being at their extreme ends coupled together by a transverse rod or member $k$. The aforementioned clip $h$ may be bolted intermediately to the limbs constituting the under-frame $g$.

What I claim as my invention and desire to secure by Letters Patent is;—

A saddle, a longitudinal reinforcing strip thereunder, having its front end secured thereto, a transverse reinforcing strip secured under the rear portion of the saddle, the rear end of the longitudinal strip being secured to the transverse strip, a leaf spring having its rear end secured to the first named strip, an underframe to the front end of which the front end of said spring is attached, strut members having their upper ends secured to said transverse strip and tension springs connecting the rear portion of the underframe to the lower portions of said strut members.

In witness whereof I have hereunto set my hand.

ROBERT WALKER SMITH.